United States Patent [19]

Kuo

[11] Patent Number: 5,635,897
[45] Date of Patent: Jun. 3, 1997

[54] MOBILE PHONE ALARM

[76] Inventor: Shih-Chun Kuo, 3F-2, No. 222, Fu Hsing N. Road, Taipei, Taiwan

[21] Appl. No.: 517,615

[22] Filed: Aug. 22, 1995

[51] Int. Cl.⁶ ........................................... H04Q 1/30
[52] U.S. Cl. .................. 340/311.1; 340/539; 340/571; 340/572; 340/825.36; 340/825.44; 340/825.46
[58] Field of Search ........................ 340/314, 539, 340/568, 571, 572, 825.36, 825.44, 825.46, 825.49, 311

[56] References Cited

U.S. PATENT DOCUMENTS

| | | | |
|---|---|---|---|
| 4,421,953 | 12/1983 | Zielinski | 340/825.46 |
| 5,402,104 | 3/1995 | LaRosa | 340/539 |
| 5,422,931 | 6/1995 | Austin-Lazarus et al. | 455/83 |
| 5,488,359 | 1/1996 | Faris et al. | 340/825.44 |

*Primary Examiner*—Jeffery Hofsass
*Assistant Examiner*—Daryl C. Pope
*Attorney, Agent, or Firm*—Bacon & Thomas

[57] ABSTRACT

A mobile phone alarm includes a phone device to be attached to a mobile phone and a body device to be carried by a user. The phone device repeatedly transmits a verification signal to the body device. The verification signal has a limited power to be identifiable within a limited, predetermined limited distance, suck as one meter, so that once the distance between the phone device and the body device is greater than the limited pre-determined distance, the body device receives no verification signal and alarms. The phone device also detects the ringing of the mobile phone and once the mobile phone is ringing, the phone device sends a signal to the body device for notifying the user.

7 Claims, 6 Drawing Sheets

MOBILE PHONE ALARM

FIELD OF THE INVENTION

The invention relates generally to an alarm device and in particular to an alarm device to be incorporated in a mobile phone for generating an alarm signal once the mobile phone has been left far away from the user and also serving to notify the user of an in-coming call when the mobile phone is located distant from the user.

BACKGROUND OF THE INVENTION

With the development of telecommunication technology, mobile phones are nowadays smaller and lighter weight than ever so as to enhance the portability. Such an improvement in portability, however, leads in the problem that the mobile phones are often left behind and lost and are hard be looked for once lost.

Further, once a mobile phone is placed at a distance far away from the user, the ringing that indicates an in-coming call may not be properly recognized by the user.

It is therefore desirable to provide a mobile phone alarm to overcome such problems.

SUMMARY OF THE INVENTION

In accordance with the present invention, the problem of lost mobile phone is overcome by providing a mobile phone alarm which comprises a phone device to be attached to a mobile phone which repeatedly transmit a verification signal (an electro-magnetic signal) of a limited power to be receivable within a limited, pre-determined range. A body device is clipped or otherwise secured to the phone user, similar to a beeper, to receive the verification signal from the phone device. The body device generates an alarm signal once the user is at a distance from the mobile phone greater than the transmission range of the verification signal to notify the user.

In accordance with another aspect of the present invention, the phone device is also designed to transmit a phone call signal (an electro-magnetic signal) to the body device once a call is coming and the phone is ringing. The body device, in response to the phone call signal, generates an alarm signal of beeping or vibrating, similar to a beeper, to notify the phone user of the in-coming call.

BRIEF DESCRIPTION OF THE DRAWINGS

The features and advantages of the present invention will become apparent in the following detailed description of preferred embodiments of the invention, with reference to the attached drawings, wherein.

DETAILED DESCRIPTION OF THE PREFERRED EMBODIMENTS

Figure 1:
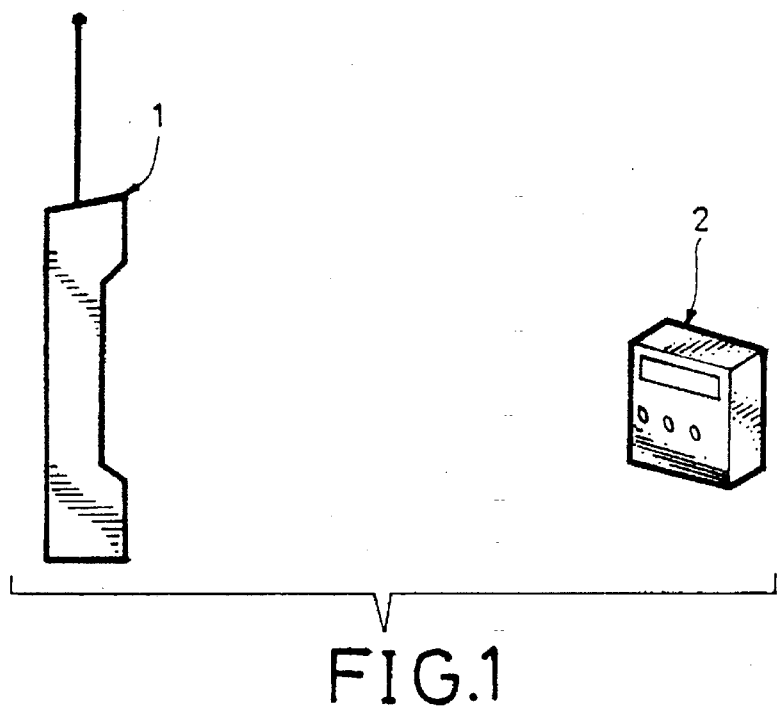
FIG. 1 is a perspective view showing a mobile phone and a mobile phone alarm in accordance with the present invention.
Figure 2:
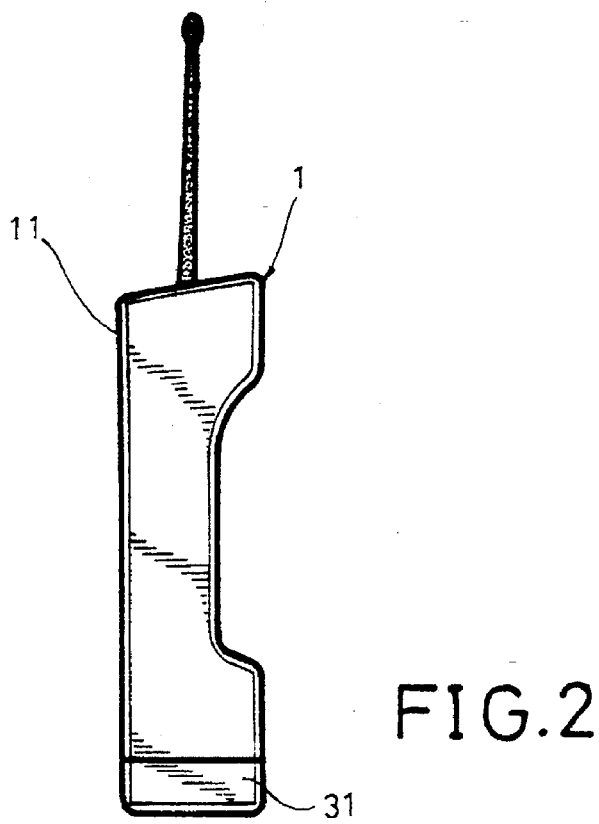
FIG. 2 is a side elevational view showing a phone device in accordance with the present invention externally attached to the mobile phone.
Figure 3:
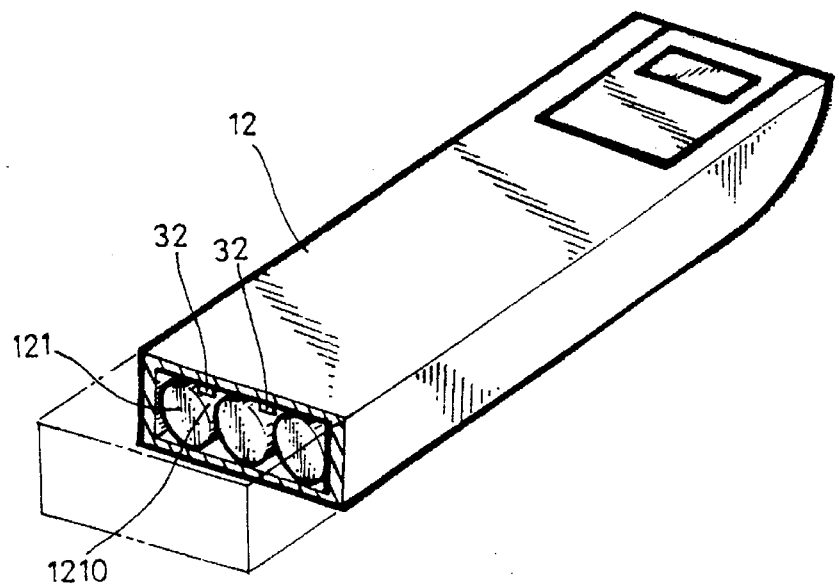
FIG. 3 is a perspective view showing an alternative phone device in accordance with the present invention that is built in the battery set of the mobile phone.

With reference to the drawings and in particular to FIGS. 1–3, wherein a mobile phone alarm constructed in accordance with the present invention is shown, the mobile phone alarm in accordance with the present invention comprises a body device 2 to be clipped or otherwise secured to for example the cloth of a user (not shown) in a way similar to a beeper to generate a user alarm signal and a phone device to be externally attached to a mobile phone 1, as that designated with the reference numeral 31 in FIG. 2 or to be built in for example a battery set 12 of the mobile phone 1, as that designated with the reference numeral 32 in FIG. 3.

In accordance with an aspect of the present invention, the phone device 31 or 32 repeatedly transmits a verification signal which is preferably an electro-magnetic signal, such as a radio frequency (RF) signal, of a limited power to be identifiable within a limited, pre-determined distance, such as 1 meter. The body device 2 which is devised to receive the verification signal from the phone device 31 or 32 generates an alarm signal, such as beeping sound or vibration to notify the user once the body device 2 does not receive the verification signal which means that the user is outside the predetermined distance range that the verification signal can reach.

In accordance with another aspect of the present invention, the phone device 31 or 32 is also devised to detect the ringing of the mobile phone 1 so as provide a phone call signal, which is preferably an electro-magnetic signal, such as an RF signal, to the body device 2 to notify the user that a call is coming.

The external phone device 31 shown in FIG. 2 is designed to attach to the bottom of the mobile phone 1 and retained there by having a leather sheath 11 that is a commonly known mobile phone accessary fit over both the external phone device 31 and the mobile phone 1. The external phone device 31 repeatedly generates and transmits the verification signal to the body device 1. The external phone device 31 also serves to detect if the mobile phone 1 is ringing and if so, generates and transmits the phone call signal to the body device 1.

The internal phone device 32 shown in FIG. 3 is designed to be disposed within the replaceable battery set 12 of the mobile phone 1 and is preferably in the form of an integrated circuit (IC) chip to be placed within a gap 1210 between cells 121. Similar to the external phone device 31 shown in FIG. 2, the internal phone device 32 repeatedly transmits the verification signal to the body device 2. The internal phone device 32 is in electrical connection with the cells 121 to detect the change in current through the cells 121 so as to identify if a call is coming in order to generate and transmit a phone call signal to the body device 2.

Figure 4:
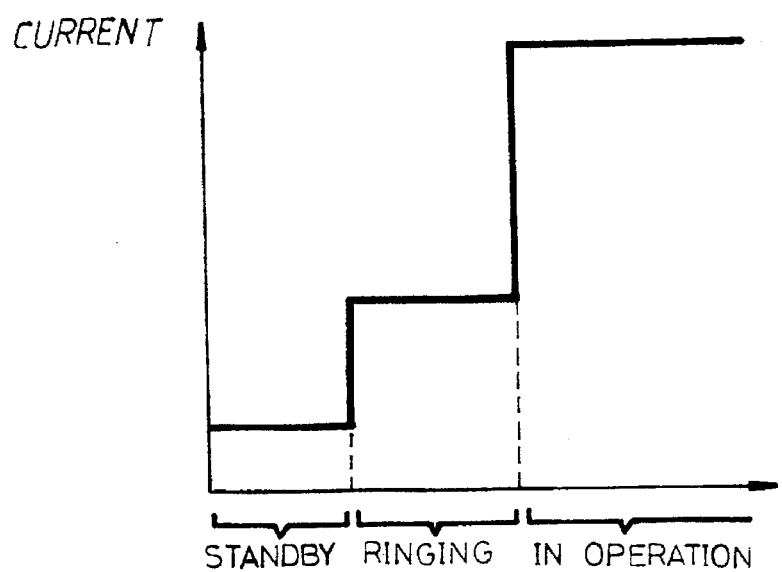
FIG. 4 is a plot of the power consumption of the mobile phone.

In FIG. 4, the current change in the mobile phone 1 in different conditions are illustrated, such as STANDBY when the current is the smallest, RINGING when the current is increased and IN OPERATION when the current is the largest. By detecting the change in the current flow, the internal phone device 32 determines if the mobile phone 1 is ringing and/or in operation.

Figure 7:
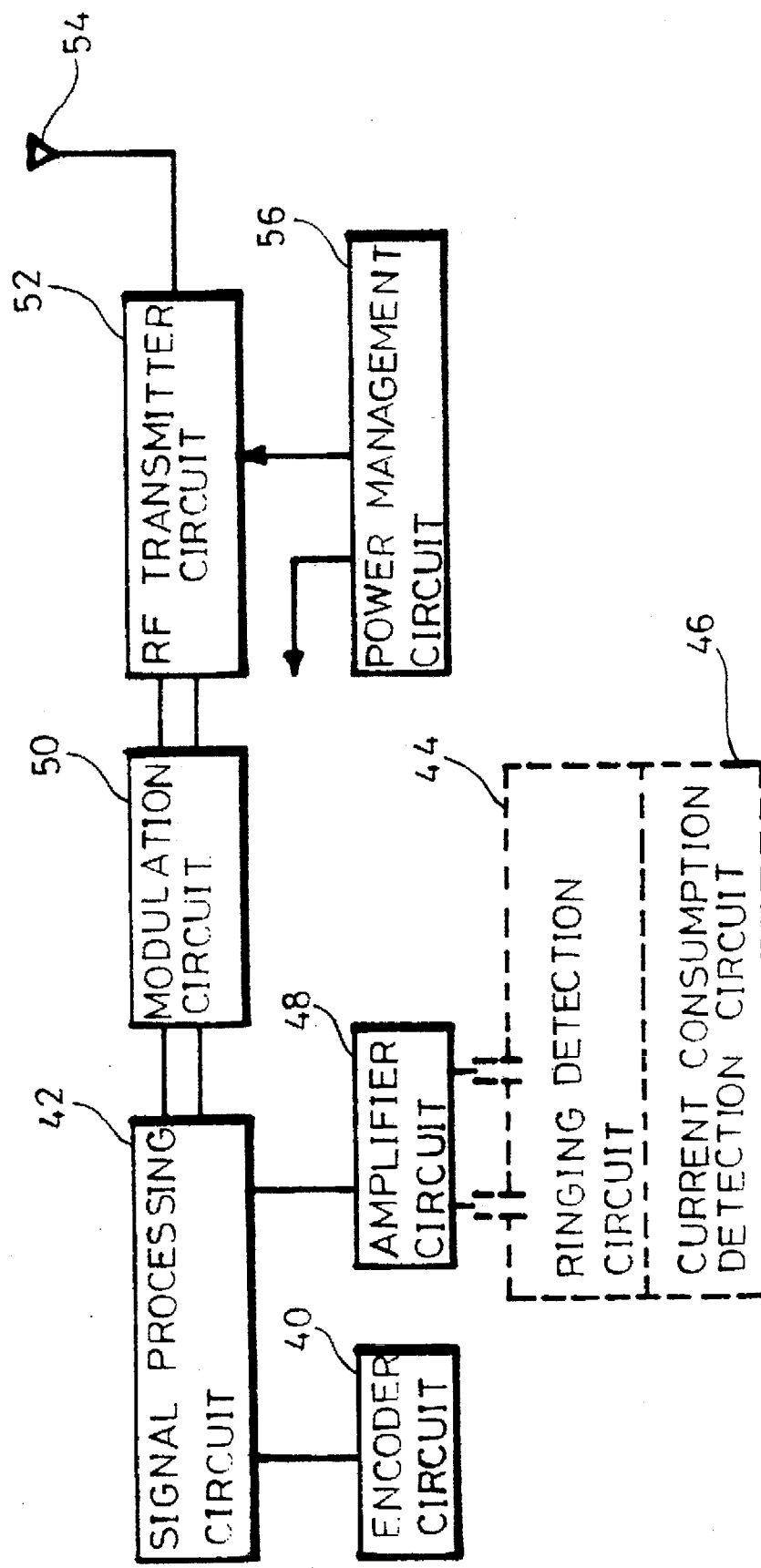
FIG. 7 is a circuit block diagram of the phone device of the present invention.

To provide the above functions, a circuit block diagram of an embodiment of the phone body 31 or 32 is illustrated in FIG. 7, comprising an encoder circuit 40 which provides a device identification signal that may be generated by a dip switch set or a circuit (not shown) to a signal processing circuit 42. A ringing detection circuit 44, which may comprise a current consumption detection circuit 46 in the embodiment of FIG. 3, to provide a ringing signal to the signal processing circuit 42, preferably via an amplifier circuit 48, to be combined with the device identification signal. The signal processing circuit 42 provides a combination of the device identification signal and the amplified ringing signal to a modulation circuit 50 from which a modulated signal is forwarded to an RF transmitter circuit 52 to generate a high frequency RF verification signal to be transmitted therefrom through an antenna 54.

A power management circuit 56 may be included in the circuit of the phone device 31 or 32 to reduce the power consumption of the circuit.

Figure 8:
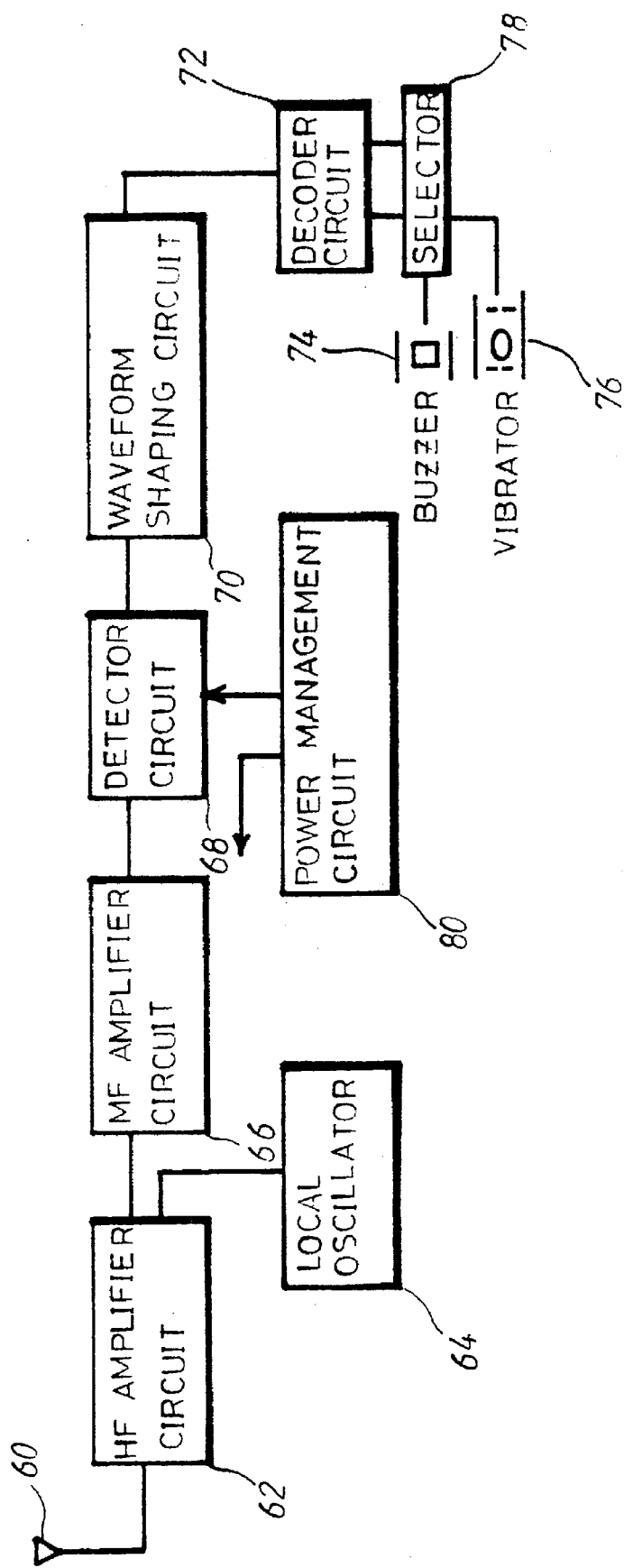
FIG. 8 is a circuit block diagram of the body device of the present invention.

In FIG. 8, a circuit block diagram of the body device 2 is illustrated, comprising an antenna 60 to receive the high frequency verification signal and/or the phone call signal from the phone device 31 or 32. The received high frequency signal is first amplified with a high frequency (HF) amplifier circuit 62 and a local oscillation signal from a local oscillator 64 is provided to the HF amplifier 62 to obtain a medium frequency (MF) signal which is then transmitted through a MF amplifier circuit 66 to a detector circuit 68 of which the output signal is sent through a waveform shaping circuit 70 to a decoder 72. The decoder 72 decodes the signal so obtained and generates an alarm signal, which is either an audio signal via a sound generating means, such as a buzzer 74 or a vibrating signal via a vibrator 76 to notify the user. A selector 78 may be provided between the alarm signal generation means, including both 74 and 75, and the decoder circuit 72 to allow the user to switch the alarm signal between the audio signal or the vibrating signal.

A power management circuit 80 may be included in the circuit of the body device 2 to reduce the power consumption of the circuit.

Figure 5:
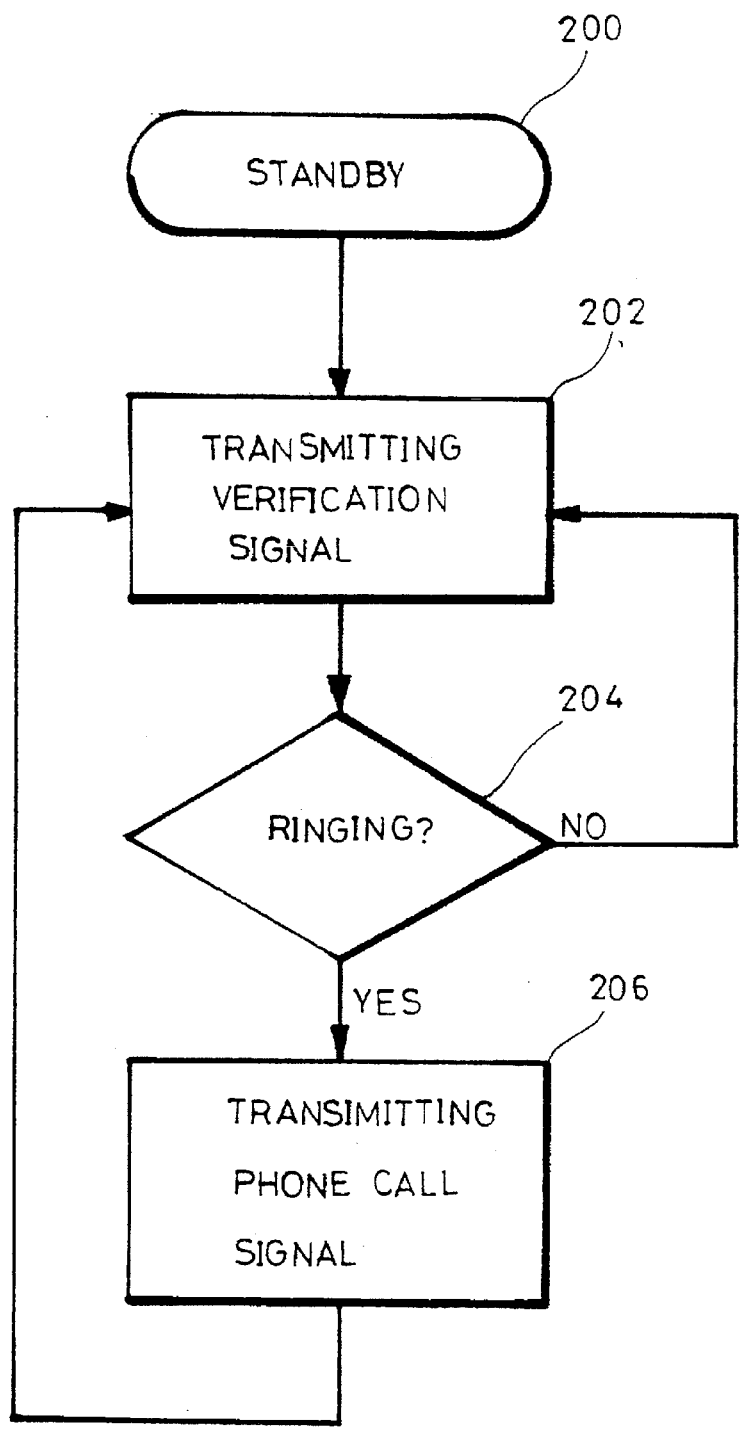
FIG. 5 shows an operation flow chart of the phone device of the present invention.

In FIG. 5, an operation flow chart of the phone device 31 or 32 is illustrated. The operation flow begins at the entry point 200 where the phone device 31 or 32 is at standby condition. Then the phone device 31 or 32 transmits the verification signal at 202. At 204, the phone device 31 or 32 detects if the mobile phone 1 is ringing. If yes, the phone device 31 or 32 transmits the phone call signal at 206 to the body device 2 and then goes back to step 202. If the detection of ringing is negative (no), the phone device 31 or 32 goes directly back to 202 to repeat transmitting verification signal to the body device 2.

Figure 6:
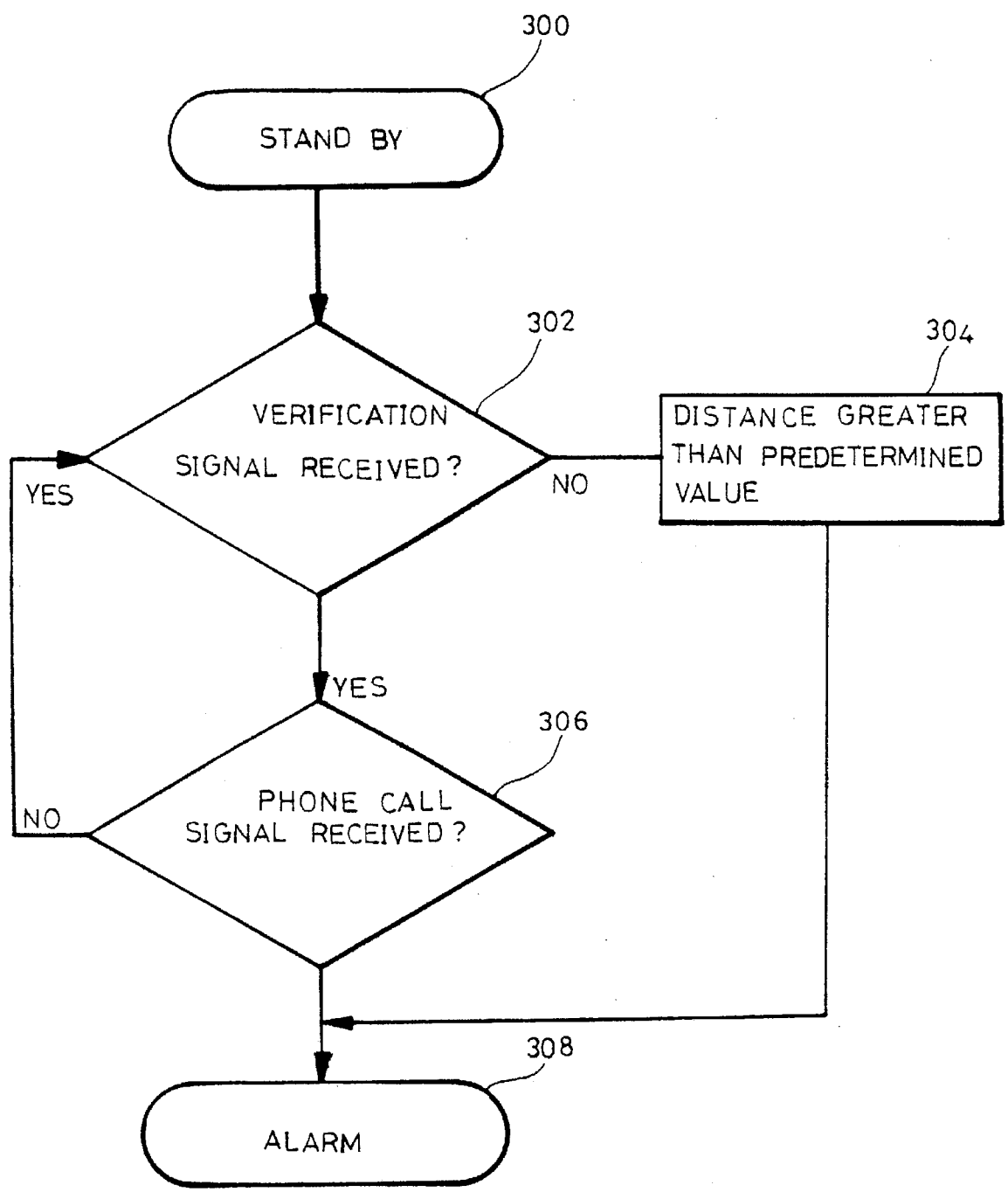
FIG. 6 shows an operation flow chart of the body device of the present invention.

An operation flow chart of the body device 2 is illustrated in FIG. 6, wherein the flow begins at the entry point 300 where the body device 2 is in standby condition. The body device 2 then tests if a verification signal is received at 302. If not, it indicates at 304 that the mobile phone 1 is located at a distance greater than the predetermined value from the body device 2 and an alarm is generated at 308. If the test of verification signal at step 302 is positive, then the body device 2 goes on to test if a phone call signal is received at 306. If no, then the body device goes back to test step 302, otherwise if a phone call signal is received, an alarm is issued at 308.

It is apparent that although the invention has been described in connection with the preferred embodiments, it is contemplated that those skilled in the art may make changes to the preferred embodiments without departing from the scope of the invention as defined in the appended claims.

What is claimed is:

1. A mobile phone alarm comprising:
   a) a body device for carrying by a user, the body device including means for receiving signals and means for issuing an alarm;
   b) a phone device for attaching to a mobile phone, the phone device including means for repeatedly transmitting a first signal having a predetermined power to be identified within a predetermined distance, means to transmit a second signal indicating a ringing condition of the mobile phone, the first and second signals being receivable by the body device; and
   c) an integrated circuit chip for disposition within a battery set of the mobile phone and an electrical connection with the battery set, the integrated chip set including means for detecting change of current flow through the battery set to determine if the mobile phone is ringing.

2. The mobile phone alarm of claim 1 wherein the phone device is externally attached to the mobile phone.

3. The mobile phone alarm of claim 1 further including an enclosure for encasing the phone device and the mobile phone to retain the phone device to the mobile phone.

4. The mobile phone alarm of claim 1 wherein the means for issuing an alarm includes a buzzer to generate an audio signal.

5. The mobile phone alarm of claim 1 wherein the means for issuing an alarm includes a vibrator to generate a vibration signal.

6. The mobile phone alarm of claim 1 wherein the means for issuing an alarm includes means for generating an audio signal, means for generating a vibration signal and selection means for switching between the audio signal generation means and the vibration signal generation means.

7. The mobile phone alarm of claim 1 wherein the predetermined distance is one meter.

\* \* \* \* \*